(12) United States Patent
Dooley

(10) Patent No.: US 7,262,539 B2
(45) Date of Patent: Aug. 28, 2007

(54) SATURATION CONTROL OF ELECTRIC MACHINE

(75) Inventor: Kevin Allan Dooley, Mississauga (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 14 days.

(21) Appl. No.: 10/996,411

(22) Filed: Nov. 26, 2004

(65) Prior Publication Data

US 2006/0113967 A1 Jun. 1, 2006

(51) Int. Cl.
*H02K 21/00* (2006.01)
*H02P 9/32* (2006.01)

(52) U.S. Cl. ............ 310/184; 310/113; 310/180; 310/187; 310/254; 322/57; 322/90

(58) Field of Classification Search ........ 310/254, 310/184, 187; 322/57, 63, 66, 89, 90, 93
See application file for complete search history.

(56) References Cited

U.S. PATENT DOCUMENTS

| | | | | |
|---|---|---|---|---|
| 1,685,970 A | * | 10/1928 | Townend et al. | 322/63 |
| 1,723,090 A | * | 8/1929 | Stevenson, Jr. | 322/28 |
| 2,291,008 A | * | 7/1942 | Tyrner | 310/184 |
| 2,540,202 A | * | 2/1951 | Harold | 322/59 |
| 2,564,320 A | * | 8/1951 | Brainard | 322/28 |
| 2,886,762 A | * | 5/1959 | Polasek | 322/24 |
| 2,939,069 A | * | 5/1960 | Dvoracek | 322/57 |
| 3,017,562 A | * | 1/1962 | Duane | 322/46 |
| 3,214,675 A | * | 10/1965 | Foster | 322/46 |
| 3,243,688 A | * | 3/1966 | Brundage | 322/57 |
| 3,344,338 A | * | 9/1967 | Sparrow | 322/75 |
| 3,443,201 A | * | 5/1969 | Williams | 322/28 |
| 3,510,752 A | * | 5/1970 | Raver et al. | 322/28 |
| 3,671,788 A | * | 6/1972 | Knudson et al. | 310/156.55 |
| 3,707,638 A | | 12/1972 | Nailen | |
| 3,753,068 A | | 8/1973 | Walker, Jr. | |
| 3,812,441 A | | 5/1974 | Sakamoto et al. | |
| 3,866,110 A | * | 2/1975 | Ruggeri | 322/57 |
| 3,961,211 A | | 6/1976 | Vergues | |
| 3,986,062 A | * | 10/1976 | Morrill | 310/172 |
| 4,004,202 A | | 1/1977 | Davis | |
| 4,032,807 A | | 6/1977 | Richter | |
| 4,039,910 A | | 8/1977 | Chirgwin | |

(Continued)

FOREIGN PATENT DOCUMENTS

CA 2051626 8/1991

(Continued)

OTHER PUBLICATIONS

General Electric Company, "150Kva Samarium Cobalt VSCF Starter/Generator Electrical System, Final Techinical Report", 1979.

(Continued)

*Primary Examiner*—Burton Mullins
(74) *Attorney, Agent, or Firm*—Ogilvy Renault LLP

(57) ABSTRACT

The invention includes an electric alternator/motor having a rotor, stator and at least one winding in the stator adapted to conduct a current, the machine also having and first and second magnetic circuits, one of which includes a saturable portion in which saturation may be controlled to permit control of the machine.

27 Claims, 5 Drawing Sheets

U.S. PATENT DOCUMENTS

| | | | |
|---|---|---|---|
| 4,138,629 A * | 2/1979 | Miller et al. ................ 318/140 |
| 4,237,395 A | 12/1980 | Loudermilk |
| 4,250,128 A | 2/1981 | Meckling |
| 4,305,031 A | 12/1981 | Wharton |
| 4,346,335 A | 8/1982 | McInnis |
| 4,392,072 A | 7/1983 | Rosenberry |
| 4,401,906 A | 8/1983 | Isobe et al. |
| 4,445,061 A | 4/1984 | Jackson, Jr. |
| 4,492,902 A | 1/1985 | Ficken et al. |
| 4,503,377 A | 3/1985 | Kitabayashi et al. |
| 4,511,831 A * | 4/1985 | McInnis ..................... 388/803 |
| 4,547,713 A | 10/1985 | Langley et al. |
| 4,562,399 A | 12/1985 | Fisher |
| 4,605,874 A | 8/1986 | Whiteley |
| 4,617,726 A | 10/1986 | Denk |
| 4,625,135 A | 11/1986 | Kasabian |
| 4,638,201 A | 1/1987 | Feigel |
| 4,656,379 A * | 4/1987 | McCarty ..................... 310/181 |
| 4,709,180 A | 11/1987 | Denk |
| 4,713,570 A | 12/1987 | Mastromattei |
| 4,763,034 A | 8/1988 | Gamble |
| 4,799,578 A | 1/1989 | Matsushita |
| 4,851,758 A * | 7/1989 | Osada et al. .................. 322/63 |
| 4,852,245 A | 8/1989 | Denk |
| 4,887,020 A | 12/1989 | Graham |
| 4,896,756 A | 1/1990 | Matsushita |
| 4,897,570 A | 1/1990 | Ishikawa et al. |
| 4,924,125 A | 5/1990 | Clark |
| 5,030,877 A | 7/1991 | Denk |
| 5,184,040 A | 2/1993 | Lim |
| 5,235,231 A | 8/1993 | Hisey |
| 5,245,238 A | 9/1993 | Lynch et al. |
| 5,260,642 A | 11/1993 | Huss |
| 5,304,883 A | 4/1994 | Denk |
| 5,350,991 A * | 9/1994 | Bae ........................... 318/727 |
| 5,397,948 A | 3/1995 | Zoerner et al. |
| 5,519,275 A | 5/1996 | Scott et al. |
| 5,555,722 A | 9/1996 | Mehr-Ayin et al. |
| 5,585,682 A | 12/1996 | Konicek et al. |
| 5,742,106 A | 4/1998 | Muraji |
| 5,770,901 A | 6/1998 | Niimi et al. |
| 5,793,137 A | 8/1998 | Smith |
| 5,798,596 A | 8/1998 | Lordo |
| 5,822,150 A | 10/1998 | Kelsic |
| 5,825,597 A | 10/1998 | Young |
| 5,834,874 A | 11/1998 | Krueger et al. |
| 5,838,080 A | 11/1998 | Couderchon et al. |
| 5,903,115 A | 5/1999 | Taylor |
| 5,912,522 A | 6/1999 | Rivera |
| 5,917,248 A | 6/1999 | Seguchi et al. |
| 5,925,999 A | 7/1999 | Lakerdas et al. |
| 5,936,325 A | 8/1999 | Permuy |
| 5,942,829 A | 8/1999 | Huynh |
| 5,952,757 A | 9/1999 | Boyd, Jr. |
| 5,953,491 A | 9/1999 | Sears et al. |
| 5,955,809 A | 9/1999 | Shah |
| 5,962,938 A | 10/1999 | Bobay et al. |
| 6,011,338 A | 1/2000 | Bell et al. |
| 6,097,124 A | 8/2000 | Rao et al. |
| 6,100,620 A | 8/2000 | Radovsky |
| 6,114,784 A | 9/2000 | Nakano |
| 6,154,019 A | 11/2000 | Valdemarsson et al. |
| 6,239,532 B1 | 5/2001 | Hollenbeck et al. |
| 6,242,840 B1 | 6/2001 | Kenk et al. |
| 6,255,756 B1 | 7/2001 | Richter |
| 6,271,613 B1 | 8/2001 | Akemakou et al. |
| 6,286,199 B1 | 9/2001 | Bobay et al. |
| 6,313,560 B1 | 11/2001 | Dooley |
| 6,323,625 B1 | 11/2001 | Bhargava |
| 6,342,746 B1 | 1/2002 | Flynn |
| 6,373,162 B1 | 4/2002 | Liang et al. |
| 6,429,615 B2 | 8/2002 | Schmider et al. |
| 6,437,529 B1 | 8/2002 | Brown |
| 6,504,261 B2 | 1/2003 | Fogarty et al. |
| 6,525,504 B1 | 2/2003 | Nygren et al. |
| 6,541,887 B2 | 4/2003 | Kawamura |
| 6,781,331 B2 | 8/2004 | Mokri et al. |
| 6,965,183 B2 | 11/2005 | Dooley |
| 7,126,313 B2 | 10/2006 | Dooley |
| 2002/0047455 A1 | 4/2002 | Dhyanchand et al. |
| 2002/0084705 A1 | 7/2002 | Kawamura |
| 2002/0084715 A1 | 7/2002 | Kakuta et al. |
| 2002/0093252 A1 | 7/2002 | Kang et al. |
| 2002/0149281 A1 | 10/2002 | Saint-Michel et al. |
| 2004/0183392 A1 | 9/2004 | Dooley |
| 2004/0239202 A1 | 12/2004 | Dooley |
| 2005/0146307 A1 | 7/2005 | Dooley et al. |
| 2006/0226721 A1 | 10/2006 | Dooley |
| 2007/0024249 A1 | 2/2007 | Dooley |

FOREIGN PATENT DOCUMENTS

| | | |
|---|---|---|
| DE | 3430590 A1 | 2/1986 |
| DE | 3430188 | 8/1989 |
| EP | 368930 | 4/1994 |
| EP | 754365 | 2/1998 |
| EP | 750806 | 8/1998 |
| EP | 1 235 327 A2 | 8/2002 |
| EP | 1 235 327 A3 | 8/2002 |
| FR | 1555855 | 12/1968 |
| FR | 2618616 | 7/1987 |
| GB | 2 184 609 A | 6/1987 |
| JP | 55-061625 | 5/1980 |
| JP | 55-61265 * | 6/1980 |
| JP | 61-231857 * | 10/1986 |
| JP | 1-138936 | 5/1989 |
| JP | 1-138938 | 5/1989 |
| JP | 6 237 561 | 8/1994 |
| JP | 7 039122 | 2/1995 |
| JP | 7 075213 | 3/1995 |
| JP | 9 205743 | 8/1997 |
| JP | 2001-16887 | 1/2001 |
| JP | 02/09260 | 1/2002 |
| JP | 2002-191158 | 7/2002 |
| JP | 2002-291216 | 10/2002 |
| JP | 2003-102159 | 4/2003 |
| WO | WO90/10971 | 9/1990 |
| WO | 91-12647 * | 8/1991 |
| WO | 99/09638 | 2/1999 |
| WO | 99/66624 | 12/1999 |
| WO | 03/003546 | 1/2003 |
| WO | WO 03/023939 | 3/2003 |
| WO | 03/028202 | 4/2003 |

OTHER PUBLICATIONS

M. Cronin, "The All-Electric Airplane as Energy Efficient Transport", SAE Journal, 1980.

Richter, E. et al., "Jet Engine Integrated Generator", Amcn. Inst. Aeronautics & Astronautics, 1981.

B. Dishner et al., "A Novel Electromechanical Approach to Constant Frequency Power Generation", IEEE Journal, 1989.

M. Cronin, "The All-Electric Airplane Revisited", SAE Technical Series, 1989.

SAE Technical Paper Series 892252, Application Considerations for Integral Gas Turbine Electric Starter/Generator revisited. 1989.

The Applicability of Electrically Driven Accessories for Turboshaft Engines, 1993.

R. Nims, "Development of an Oilless, Gearless, and Bleedable under Armour Power Unit", ASME paper, 1995.

Richter et al., "Preliminary Design of an Internal Starter/Generator for Aplication in the F110-129 Engine", SAE Aerospace Atlantic Conference, 1995.

R. Nims, "Armor-plated auxiliary power", Mechanical Enginering, 1997.

PCT International Search Report for International application No. PCT/CA2004/000689 mailed Sep. 16, 2004.

English version (translation) of the German patent DE 3430590 A1 cited in the Information Disclosure Statement filed on Sep. 27, 2004.

International Search Report PCT/CA2005/001657, Feb. 22, 2006.

U.S. Appl. No. 11/379,620, filed on Apr. 21, 2006, by Kevin Allan Dooley.

U.S. Appl. No. 11/420,602, filed May 26, 2006, by Kevin Allan Dooley.

U.S. Appl. No. 11/533,548, filed Sep. 20, 2006, by Kevin Allan Dooley.

* cited by examiner

SATURATION CONTROL OF ELECTRIC MACHINE

CROSS REFERENCE TO EARLIER APPLICATION

The applicant's co-pending U.S. patent application Ser. No. 10/444,952 is hereby incorporated by reference. The invention, however, is not necessarily limited to such architecture, as will become apparent to the skilled reader in light of the teachings herein.

TECHNICAL FIELD

The invention relates to electric machines such as alternators and motors, and in particular to the control of such machines.

BACKGROUND OF THE ART

Referring to FIG. 1, a typical permanent magnet (PM) alternator or motor has a rotor 102 supporting permanent magnets 104 and mounted on a rotatable shaft 108. A stator 110 has a plurality of windings 112 between a plurality of teeth 114 mounted to a back iron 116. (For ease of illustration, the adjacent elements of windings 112 in FIG. 1 are shown unconnected.) When operated in an alternator mode, an external torque source forces rotation of the shaft, and the interaction of the magnets and the windings causes a magnetic flux to loop the windings in the slots. As magnetic flux varies due to rotor rotation, voltage is generated in windings 112, which results in an output current when a load is connected to the output of the machine. When operated in a motor mode, voltage from an external source (not shown) is applied to windings 112, and the resulting current induces magnetic flux in the stator and rotor which, when appropriately controlled, causes the rotor to rotate to produce torque. PM machines can have an "inside rotor" configuration as shown in FIG. 1, or an "outside rotor" configuration (not shown).

The output voltage and frequency of prior art PM alternators is determined by rotor speed, which present challenges where rotor speed cannot be independently controlled. It would therefore be desirable to improve the controllability of electric machines, generally, and in particular PM machines.

SUMMARY OF THE INVENTION

In one aspect, the present invention provides an electric alternator/motor comprising: a rotor having a plurality of permanent magnets; a stator having a plurality first slots and a plurality of second slots, the first slots being located on a periphery of the stator opposing the rotor, the second slots being located on an opposite side of the first slots relative to the rotor; at least a first winding disposed in a plurality of said first and second slots; at least a first magnetic circuit defined in the stator and rotor which encircles at least one first slot in which the first winding is disposed; at least a second magnetic circuit encircling at least one of the second slots in which the first winding is disposed, the second magnetic circuit sharing a common portion of the stator with the first magnetic circuit, the second magnetic circuit including a magnetically saturable portion of the stator distinct from the common portion; at least a second winding disposed adjacent the first winding in a plurality of second slots; a third magnetic circuit defined in the stator and including the magnetically saturable portion of the stator, the third magnetic circuit operatively associated with current passing through the second winding; a current source connected to the second winding and adapted to pass a sufficient amount of said current through the second winding to substantially saturate said magnetically saturable portion of the stator; and a controller adapted to vary said current provided to the second winding to vary a saturation level of the magnetically saturable portion.

In another aspect, the invention provides a machine operable as at least one of an electric alternator/generator and an electric motor, the machine comprising a rotor and stator assembly, the assembly having a stator including at least a first winding, the assembly also having first and second magnetic circuits and a saturation control assembly, the first magnetic circuit including the rotor and encircling at least a first portion of the first winding, the second magnetic circuit encircling at least a second portion of the first winding remote from the first magnetic circuit, the first and second magnetic circuits magnetically coupled when current flows in the first winding, the second magnetic circuit including a portion which is magnetically saturable, the saturation control assembly being operatively associated with the magnetically saturable portion of the second circuit and operable to controllably vary a saturation level of said saturable portion.

In another aspect, the invention provides an electric alternator comprising: a magnetic rotor; a stator having a body and at least one power winding adapted to generate voltage and current at least partially in response to rotor movement relative to the stator, the stator further comprising at least one saturable core inductor assembly in series with the power winding, wherein a saturable core portion of the saturable core inductor assembly is intrinsically provided by the stator body; and a saturation control apparatus adapted to selectively control a saturation level of the saturable core portions.

In another aspect, the invention provides an electric machine operable as at least one of an electric alternator/generator and an electric motor, the machine having a rotor and a stator, the stator including at least a first winding, the machine comprising: a first magnetic circuit which includes the rotor and encircles at least a first portion of the first winding; a second magnetic circuit which encircles at least a second portion of the first winding, the first and second magnetic circuits magnetically coupled when current flows in the first winding, the second magnetic circuit including a portion which is magnetically saturable; and means for controllably varying a saturation level of said saturable portion.

In another aspect, the invention provides a method of regulating an electrical output connected to a load, the method involving at least one alternator connected to the load, the alternator having a magnetic rotor, a stator and at least one stator winding, the winding associated with a primary magnetic circuit including the rotor and a secondary magnetic circuit defined in the stator, the secondary magnetic circuit being magnetically coupled to the primary magnetic circuit and including a magnetically saturable portion, the method comprising the steps of moving the rotor relative to the stator to generate an output current in the winding, and controllably varying a saturation level of a portion of the secondary magnetic circuit.

In another aspect, the invention provides a method of power sharing among such machines. Still other inventions are disclosed in this specification and attached figures, as well, and the present application claims all such inventions.

BRIEF DESCRIPTION OF THE DRAWINGS

For a better understanding of the present invention and to show more clearly how it may be carried into effect, reference will now be made by way of example to the accompanying drawings, showing articles made according to preferred embodiments of the present invention, in which.

DESCRIPTION OF THE PREFERRED EMBODIMENTS

Figure 1:
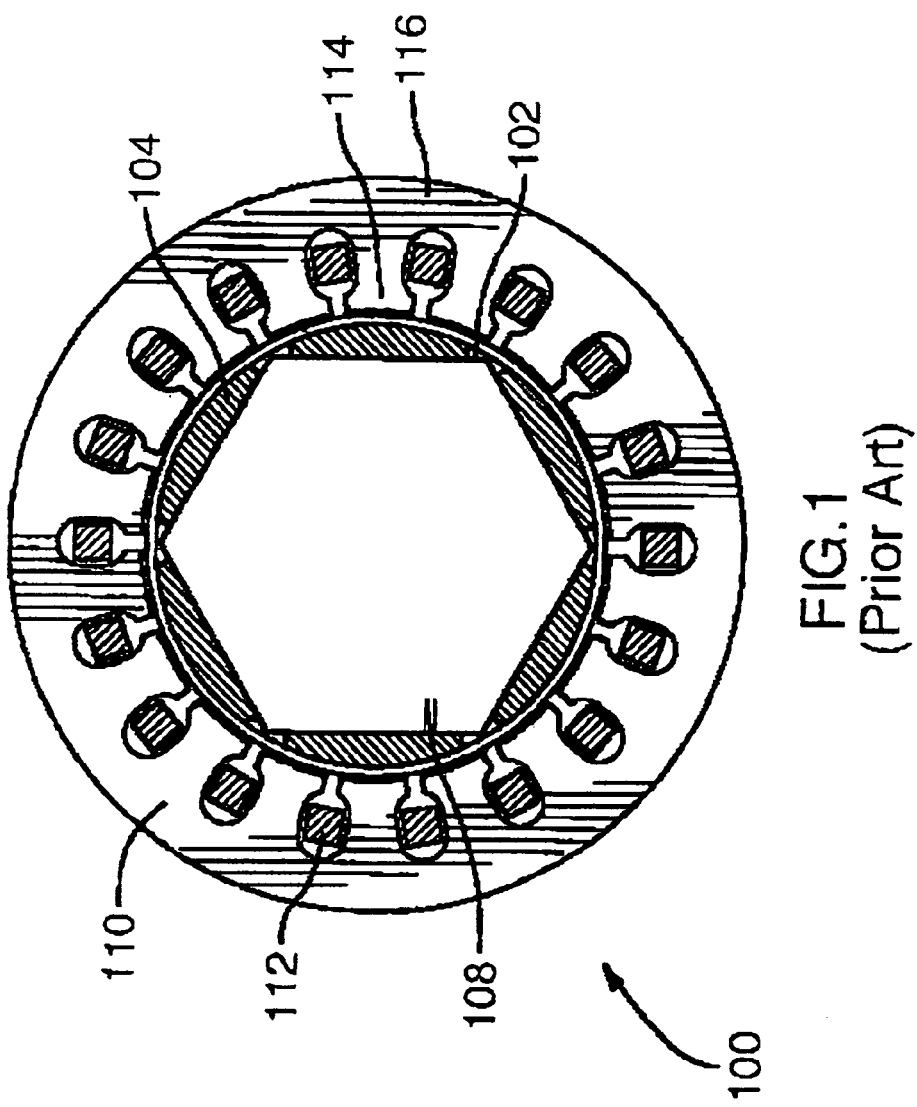
FIG. 1 is a somewhat schematic cross-sectional view of a prior art permanent magnet alternator/motor.
Figure 2:
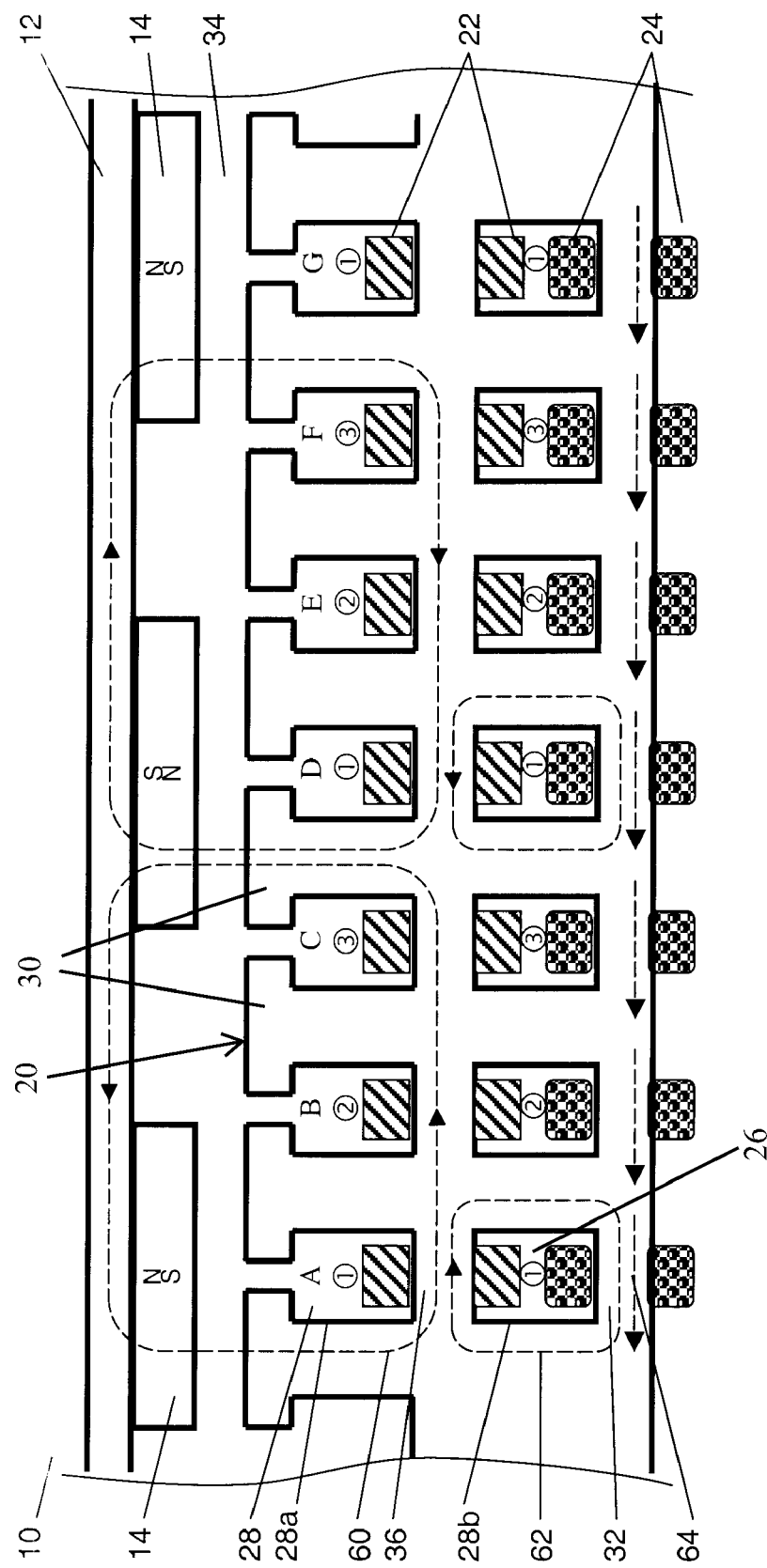
FIG. 2 is somewhat schematic partial cross-sectional view of a alternator/motor according to the present invention.

Referring to FIG. 2, a portion of a permanent magnet (PM) electric machine according to the present invention is depicted in at 10. For ease of illustration and description, FIG. 2 shows a linear arrangement of the electric machine 10, however it is to be understood that the machine is generally preferred to have a circular architecture, with an inside or outside rotor. It will also be understood by the skilled reader that FIG. 2 and the accompanying description are schematic in nature, and that many routine details of the design have been omitted for clarity. The machine 10 may be configured as an alternator to generate electrical power, or motor to convert electrical power into mechanical torque, or both. The description below is directed to an electric machine operable as both and alternator and motor.

Alternator/motor 10 has a rotor 12 with permanent magnets 14 which is mounted for rotation relative to a stator 20. Stator 20 has at least one power winding 22 and preferably at least one control winding 24, and this embodiment stator 20 has a 3-phase design with three electromagnetically-independent power windings 22 (the phases are denoted by the circled numerals 1, 2, 3, respectively) and, correspondingly, three independent control windings 24. The power and control windings are separated in this embodiment by a winding air gap 26 and disposed in radial slots 28 between a plurality of adjacent teeth 30. (For ease of illustration in FIG. 2, the adjacent elements of control winding 24 are shown unconnected. For ease of description, the adjacent slots 28 are indicated as A, B, C, D, etc.) Power winding 22 and control winding 24 are electrically isolated from one another. A back iron 32, or control flux bus as it is described in this application, extends between slots 28. A rotor air gap 34 separates rotor 12 and stator 20 in a typical fashion. A core or "bridge" portion or "power flux bus" 36 portion of stator also extends between adjacent pairs of teeth 30 between adjacent portions of power winding 22.

The materials for PM machine 10 may be any deemed suitable by the designer. Materials preferred by the inventor are: samarium cobalt permanent magnets, copper power and control windings, a suitable saturable electromagnetic material for the stator teeth such as electrical silicon steels commonly used in the construction of magnetic machines, power and control flux busses. The stator teeth, power and control flux busses may be integral or non-integral with one another, as desired. The designer will select the rotor and stator dimensions and materials based at least in part on the desired properties of the magnetic circuits (described below) in the machine to yield the desired machine performance, etc. The control flux bus 32 is magnetically saturable, as will be described below.

Power winding 22 in this embodiment consists of a single conductor which enters slot 28 on a first side of power flux bus 36, crosses power flux bus 36 at the other end and exits slot 28 on the second or other side of power flux bus 36 (i.e. opposite to the first side, or side of entry) and proceeds to a next slot 28 of the same phase, where the power winding 22 preferably enters this next slot from the second side of power flux bus 36 instead of the first side, as described above. The winding of power winding 22 is preferably similar to that described in the incorporated reference.

Meanwhile, control winding 24 is wrapped around the control flux bus, in this embodiment preferably multiple times, such as 25 times, for reasons described below. The direction of winding between adjacent appropriate slots (i.e. appropriate to maintain phase correspondence with the power winding) is preferably the same from slot to slot, and thus alternatingly opposite relative to the power winding 22, so that a net-zero voltage is induced in the control winding, as will also be described further below. Control winding 24 is connected to a current source and control system 50 (see FIG. 3), which in this example includes a variable current DC source and an appropriate solid state control system preferably having functionality as described further below. The current provided by such source is preferably sufficient to saturate control bus 32, as will be described.

Figure 3:
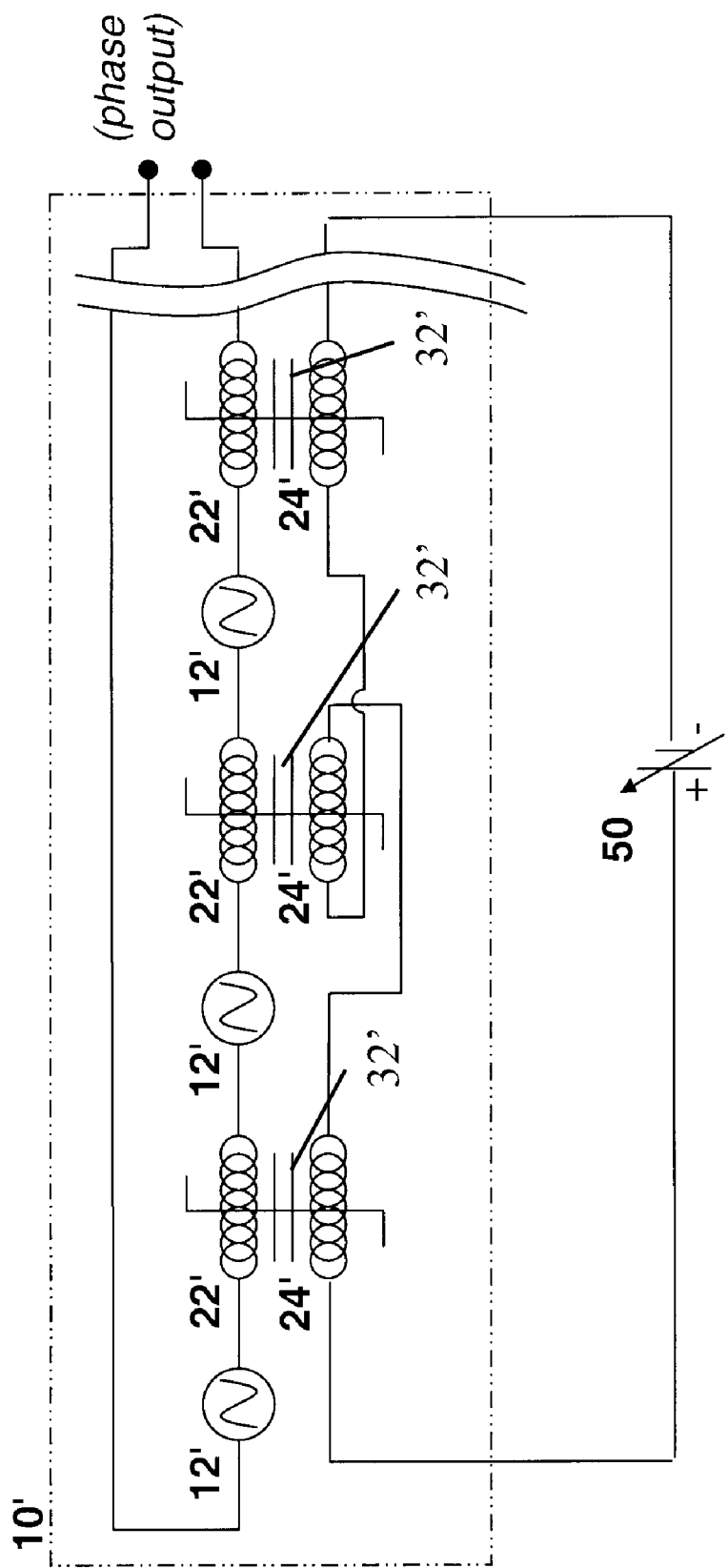
FIG. 3 is a schematic of a partial equivalent circuit of the alternator/motor of FIG. 2, illustrating its functional aspects.

Referring to FIG. 3, alternator/motor 10 as just described can also be represented schematically by an equivalent circuit 10' having a plurality of alternating current sources 12' (i.e. each, equivalent to the moving magnetic rotor system in conjunction with the portion of a power winding 22 located in slot portions 28a) connected to a plurality of power inductors 22' (i.e. equivalent to the portion of the primary winding 22 located in the slot portion 28b), the current sources 12' and power inductors 22' arranged alternately in series. Associated with power inductors 22' are a plurality of control inductors 24' (i.e. equivalent to control winding 24) having saturable cores 32' (equivalent to the saturable control flux bus 32). Control inductors 24' are connected to a variable DC current source and control system in this example, represented by 50, as will be described further below. Therefore, one can see that primary winding 22, control winding 24 and control flux bus 32 co-operate in the present invention to provide an saturable core inductor on-board the stator 12. Saturable core inductors are known to be useful in the regulation of AC power, and in one aspect the present invention provides an integrated approach to implementing a regulation scheme of this generic type, as will be further described.

Referring again to FIG. 2, in use, in a alternator mode rotor 12 is moved relative to stator 20, and the interaction of magnets 14 and power windings 22 creates a primary magnetic flux within PM machine 10 along a primary magnetic flux path or magnetic circuit 60. The primary flux induces a voltage in the power winding, which when an electrical load is connected results in an induced current, and the induced current causes a secondary magnetic flux to circulate an adjacent secondary magnetic flux path or magnetic circuit 62. The primary and secondary circuits are thus magnetically coupled when a current flows in the power winding. The secondary magnetic circuit 62 is for the most part isolated from the rotor and primary magnetic circuit 60. (It is to be understood that this description applies only to phase "1" of the described embodiment, and that similar interactions, etc. occur in respect of the other phases). The skilled reader will appreciate in light of this disclosure that it may be desirable in many situations to include a regulation apparatus to maintain a minimum current in the power winding during no-load conditions.

Primary magnetic circuit 60 includes rotor 12, rotor air gap 34, power flux bus 36 and the portion of stator teeth 30 between rotor 12 and power flux bus 36. Primary magnetic circuit encircles a portion of power winding 22 and, in use as an alternator causes a current flow in power winding 22. Secondary magnetic circuit 62 includes power flux bus 36, control bus 32 and the portion of stator teeth 30 between control bus 32 and power flux bus 36. In this embodiment, secondary magnetic circuit encircles the portions of the power winding 22 and control winding 24 in slot 28b. Power flux bus 36 divides slot 28 into two slot portions or openings 28a and 28b, with one opening 28a for the power winding only, and another opening 28b for the power and control windings. The primary magnetic circuit encircles an opening 28a while the secondary magnetic circuit encircles an opening 28b. Opening 28a is preferably radially closer to the rotor than opening 28b. Power flux bus 36 is preferably common to both the primary and secondary magnetic circuit paths and thus the primary and secondary magnetic circuits are magnetically coupled, as mentioned.

A tertiary magnetic circuit 64 preferably circulates around control bus 32, as partially indicated in FIG. 2 (i.e. only a portion of the tertiary circuit is shown, as in this embodiment the tertiary circuit circulates the entire stator). The control flux bus 32 is preferably common to both the secondary and tertiary magnetic circuit paths and thus the secondary and tertiary magnetic circuits are also magnetically coupled. As mentioned, at least a portion of control flux bus 32 is saturable.

When operated as an alternator, the present invention permits the output of the power winding(s) 22 to be controlled through a manipulation of current supplied to control winding(s) 24, as will now be described.

As explained above, the equivalent power inductor 22' is formed by the portion of the power winding 22 in slot 28b and the secondary magnetic circuit 62, as schematically represented by the equivalent circuit of FIG. 3. The control winding 24 shares the secondary magnetic circuit, however since it is preferably wound in the same direction as the power winding 22 in each slot, as mentioned above, the effect achieved is similar to that provided by alternatingly reversed saturable inductors, and there is preferably substantially no net voltage generated within the control winding 24 by flux in the secondary magnetic circuit.

The application of a DC current from the source 50 to the control winding 24 results in a DC flux circulating circuit 64 in the control flux bus 32. At the instant in time depicted in FIG. 2, it can be seen that the DC flux in tertiary magnetic circuit 64 in the control flux bus 32 is in the same direction in slot A as the AC flux in secondary magnetic circuit 62, but in slot D the direction of the DC flux in tertiary magnetic circuit 64 in the control flux bus 32 is opposite to the AC flux in secondary magnetic circuit 62. As the DC current is increased in the control winding 24, the flux density in the control bus 32 is increased such that the saturation flux density is eventually reached. It will be understood that saturation is reached first in the regions in the control bus where the AC flux and the DC flux are in the same direction, and that at higher DC control currents both regions of the control bus become saturated regardless of flux direction. Once saturation occurs, the AC flux in the secondary magnetic circuit due to the current in the power winding, is very significantly reduced.

As mentioned, the control winding pattern relative to the power winding preferably results in a near net zero voltage induced in the control winding, which simplifies control. Also, since the DC control current through both control flux buses 32 produces magnetic fluxes in different directions relative to the power winding 22, one bus 32 will saturate more in one cycle of the AC power while the other bus 32 will saturate more in the other, thus tending to equalize the control action through each half-cycle.

Once saturated, magnetic materials substantially lose their ability to conduct magnetic flux, and as such appear to be non-magnetic to both AC magnetic forces ($H_{AC}$) and further changes in DC magnetic influence ($H_{DC}$). The net effect of this saturated condition in the control bus 32 is thus to virtually eliminate the inductance due to the secondary magnetic circuit, which thereby significantly reduces inductance of the machine.

Furthermore, as the current flow in the power winding 22 increases, for example due to an increase in the external load or an increase in the generated output voltage due to an increase in operating speed, the portion of the control flux bus 32 in which the flux directions are instantaneously opposing will become less saturated, which causes a proportional increase in the inductance. This effect tends to cause the output current to remain somewhat constant. Thus the present invention causes the power output current of the alternator to become a function of the control current. The maximum inductance of the equivalent power inductor 22' formed by the secondary magnetic circuit is related to the physical dimensions of the portions carrying the secondary magnetic circuit. The power winding short circuit current is related to the ampere-turns in the control winding by:

$$IP*Np+K=IC*Nc$$

where: Np and Nc are the number of turns in the power and control windings, respectively, IP and IC are the currents in the power and control windings, respectively, and K is a constant which is inversely proportional to the maximum inductance of the power winding and other machine design features.

This permits manipulation of the output of power winding 22, and thus control winding 24 may be used as a source of control of PM machine 10. Means for controlling the operation of PM machine are thus available within the machine itself, as the "control" current may be generated by the PM machine 10 power windings, typically in conjunction with rectifiers. In some instances, therefore, no external source of control current may be required in conjunction with an electronic current control, although arranging the control winding in series with the rectified output current may also be used to control current to some extent. The novel architecture of the present invention therefore lends itself to many novel possibilities for control systems for the machine, a few examples of which will now described.

For example, the output (i.e. from a power winding 22) of alternator 10 may be controlled by connecting control winding 24 to a power supply 50, and a current applied to the control winding preferably sufficient to fully saturate the control flux bus 32, such saturation being caused by magnetic flux flowing along tertiary path 64 induced by current passing though control winding 24, which is wrapped around control flux bus 32 in this embodiment. When saturation occurs, flux around the secondary magnetic circuit 62 is effectively eliminated, and the magnetic relationship between the power windings and the secondary magnetic circuit is such that inductance in the power winding is virtually eliminated. Thus, more current is permitted to flow in the power winding. Therefore, the current level provided by controlled current source supply 50 can be continuously varied, as required, to regulate the output current of the power windings (and thus, ultimately, output voltage) over a range of rotor speeds and electrical loads. In order to effect constant output voltage control, for example, a feedback control circuit is used by the control system of source 50 to compare the alternator output voltage (i.e. the output of power winding 22) to a fixed reference (e.g. representative of a desired output voltage level(s)), and control can be configured such that, when the alternator output voltage is less than a desired reference level, a command is provided to increase the control current to increase saturation level and therefore output current, and thus voltage. Likewise, when the alternator output voltage is above a desired reference value (which may or may not be the same reference value mentioned above), a command is similarly provided to reduce the control current to decrease saturation level and therefore output current, which ultimately permits output voltage control as well. In this way, the output voltage of the alternator can be regulated.

In another control method, if no current is supplied to control winding 24, the output of power winding 22 is reduced and may be, by design, limited by the construction of the machine such that the machine's impedance is sufficient to limit short circuit currents to that which the machine may comfortably handle without damage (i.e. the short circuit current is low enough that it would not, for example, pose a danger such a machine overheating, etc.). In this respect, the present invention operates in a similar manner reminiscent of the "fusible-secondary" embodiment of the applicants co-pending U.S. patent application referred to and incorporated above.

Many other control schemes are also possible, including the modulation of the control current (i.e. the current in control windings 24) control with a rapidly varying current so as to cause cyclic amplitude modulation of the alternator output, thereby resulting in the generation of new output frequencies (or side bands) which are different from the raw frequency of the machine (i.e. speed times pole pair frequency of the alternator).

Magnetic flux preferably circulates the tertiary magnetic circuit 64 in the same direction around the control flux bus 32. As mentioned above, although the control winding is provided in the slots corresponding to a particular phase of the three-phase machine described, the power windings are wound in the opposite direction in each slot which is due to the opposite polar arrangement of the magnets 14 associated with each adjacent slot of the phase. To ensure that a uniform direction for the tertiary magnetic circuit 64 is provided, as mentioned the control windings are preferably wound in the same direction in all slots. Also as mentioned, a net-zero voltage is induced in control windings 24, which is desirable because a relatively low DC potential is required to provide DC control currents, thus no special considerations are required to remove a significant AC potential on the control winding.

Figure 5:
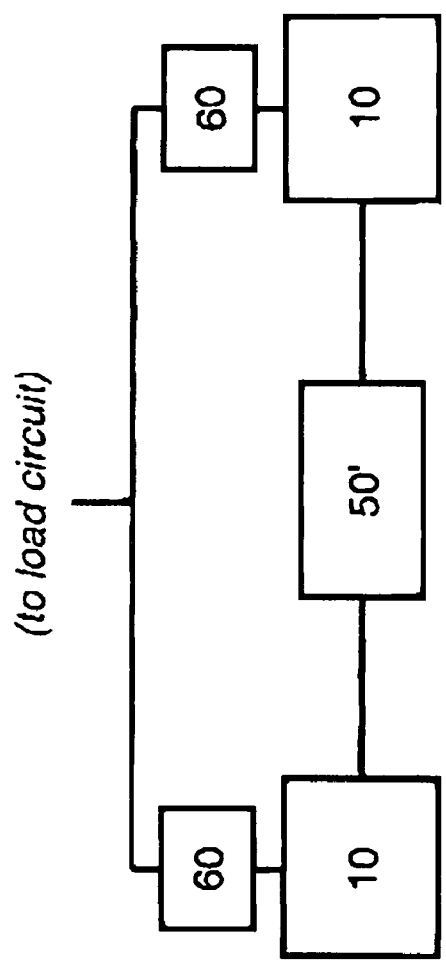
FIG. 5 is a block diagram schematically illustrating another aspect of the present invention.

The present invention also advantageously permits load to be shared between a plurality of alternators/generators. The control winding controls the output current of the machine. Thus, referring to FIG. 5, if several alternators 10 are connected to simple rectifiers 60, the output of the rectifiers can be directly connected together such to feed a common load circuit. Each alternators contribution to the load current is set by control of the DC current (in this example) provided to each alternator from controlled source 50'. In this way, if a single alternator should fail or be shut down, a control system integrated in 50 can sense this and provide a seamless sharing of load by increasing the current contribution of one or more of the remaining alternators to preferably make up the deficit from the failed or shut down alternator.

Figure 6:
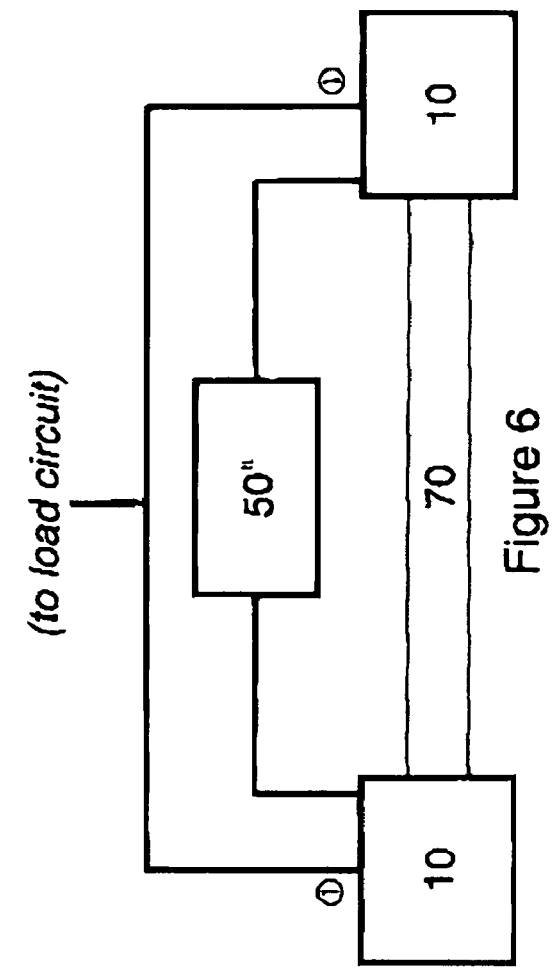
FIG. 6 is a block diagram schematically illustrating another aspect of the present invention.

It is also possible with this invention to connect properly phased alternators 10 directly together such that the AC output of a plurality of alternators 10 having matched phases (e.g. phase "1", as described above) can be parallely connected, as shown in FIG. 6. Current sharing control is provided through control system 50" which also adjusts the control current in each alternator as described above. This can lead to certain advantages of mechanical arrangements when the maximum diameter or shaft length of a single machine must be maintained below a particular value for, say, rotor dynamic or other reasons. In this way, two smaller machines 10 on a single shaft 70, for example, can provided a sufficiently large power output to a larger shared common load circuit.

In both of the above examples, this permits a much simpler means by which power may be shared, and does not require the complicated control systems of the prior art. This feature may be used advantageously, as well, in a "dual channel" electric machine, as described in the applicant's co-pending patent application incorporated above. Referring again to FIGS. 5 and 6, for example both machines 10 can be integrated in to a single rotor-stator assembly.

in another embodiment, as discussed above, primary flux bus 36 may be provided with a low Curie point materials in accordance wit the applicant's co-pending application incorporated above, so as to provide thermal protection in the event that a fault causes normal operating temperatures to be exceeded.

Control schemes such as those disclosed above may be employed individually or may be combined as desired to permit several control features to exist contemporaneously within the PM machine. As prior art fixed-geometry PM machines typically are not controllable in any way other than by the speed at which they are operated, this controllability feature of the present invention is of significant value to the PM machine designer, particularly in those applications where the rotational speed of the machine cannot itself be used to control machine output. The present invention also offers a robust and reliable design suitable for aerospace applications. The power-sharing opportunities offered by the present invention also cannot be ignored.

Figure 4:
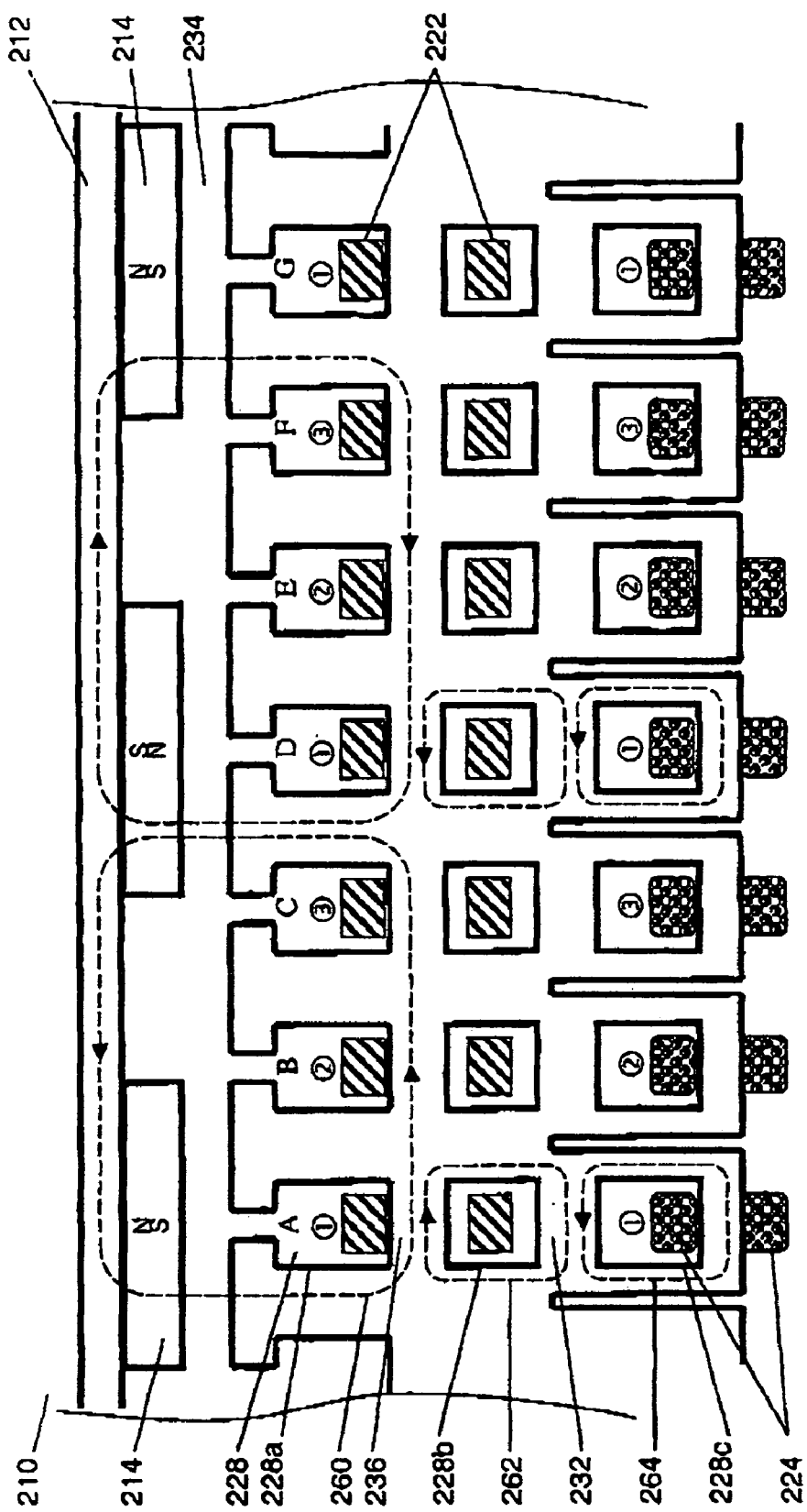
FIG. 4 is similar to FIG. 2, but depicting another embodiment of the invention.

In another embodiment, shown in FIG. 4, the control winding 224 is provided in a separate closed slot 228c adjacent to the closed slot portion 228b. The secondary magnetic circuit 262 and tertiary magnetic circuit 264 share the control flux bus 232. Reference numerals in FIG. 4 are similar to those of FIG. 2, but incremented by two hundred.

In another embodiment, not depicted, rather than rely on a control winding 24 and controlled current source 50 for saturation control, the control flux bus may be saturated instead with a permanent magnet brought into close proximity to the control flux bus by an appropriate control and actuation system, which may be mechanical, electrical, electronic or otherwise, or combinations thereof.

The present invention may also be used for electric motor control purposes. For example, when used as a starter motor, the present invention may be used to vary the impedance of the motor and thereby control current transients experienced during motoring, the torque speed relationship can also be adjusted to some degree using the control winding, since the phase angle between the rotor mmf and the armature mmf are variable due to the variable inductance of the power winding. Similarly, other modes of control are possible for alternators/generators, as well. For example, as briefly mentioned above, varying or modulating the saturation level appropriately may be used to control the frequency of output alternating current in the power windings by variably shifting the generated frequency, as the alternator speed is varied, so as to provide a desired constant output frequency. This may be done using amplitude modulation techniques such that the alternator output frequency consists of two or more frequency components (i.e. sum and difference frequencies or sidebands). Appropriate filtering, subtraction or detection of one of the frequencies will result in a new single output frequency which is related to the sum or difference between the alternator frequency and the control frequency. Active rectification of the envelope of a modulated alternator output could also be used to provide a new power frequency.

The above description is therefore meant to be exemplary only, and one skilled in the art will recognize that other changes may also be made to the embodiments described without departing from the scope of the invention disclosed. For example, the machine may be single or multi-phase, single or multi-channel. The windings may have single or multiple turns per slot, the number of turns of a winding not necessarily have to be a whole number, the number of power windings does not have to equal the number of control windings, and one or more windings may perhaps be present in a slot. The windings may be any conductor(s) (i.e. single conductor, more than one wire, insulated, laminated. Litz etc.) or may be superconductors. In multiphase machines, there may be delta or Y-connected windings in accordance with known techniques. There need not be an air gap between the power and control winding, as long as the windings are electrically isolated from one another. The rotor can be any electromagnetic configuration suitable (i.e. permanent magnet rotor not necessary), and may be provided in an outside or inside configuration, or any other suitable configuration. Other winding configurations are possible, and the ones described above need not be used at all, or throughout the apparatus. Also, the magnetic circuits described can be arranged in the stator (and/or rotor) in any suitable manner. Likewise, the stator and rotor may also have any suitable configuration. Any suitable saturation means may be used. Although a DC source is preferred for control of saturation in some embodiments described above, an AC source may also be used in certain circumstances to achieve desired results, as the skilled reader will understand.

Still other modifications which fall within the scope of the present invention will be apparent to those skilled in the art, in light of a review of this disclosure, and such modifications are intended to fall within the equivalents accorded to the appended claims. In this application, it is to be understood that the term 'alternator' is used sometimes used generically to mean a device used for generating electricity, and is not always intended therefore to be limited to a device for generating an output alternating current.

What is claimed is:

1. An electric alternator/motor comprising:
    a rotor having a plurality of permanent magnets;
    a stator having a plurality of first slots and a plurality of second slots, the first slots being located on a periphery of the stator opposing the rotor, the second slots being located on an opposite side of the first slots relative to the rotor;
    at least a first winding disposed in a plurality of said first and second slots;
    at least a first magnetic circuit defined in the stator and rotor which encircles at least one first slot in which the first winding is disposed;
    at least a second magnetic circuit encircling at least one of the second slots in which the first winding is disposed, the second magnetic circuit sharing a common portion of the stator with the first magnetic circuit, the second magnetic circuit including a magnetically saturable portion of the stator distinct from the common portion;
    at least a second winding disposed adjacent the first winding in a plurality of second slots;
    a third magnetic circuit defined in the stator and including the magnetically saturable portion of the stator, the third magnetic circuit operatively associated with current passing through the second winding;
    a current source connected to the second winding and adapted to pass a sufficient amount of said current through the second winding to substantially saturate said magnetically saturable portion of the stator; and
    a controller adapted to vary said current provided to the second winding to vary a saturation level of the magnetically saturable portion.

2. The electric alternator/motor of claim 1, wherein the secondary magnetic circuit encircles only one of said second slots.

3. The electric alternator/motor of claim 1, wherein the second winding is disposed in second slots which are distinct from but adjacent to the second slots in which the first winding is disposed.

4. The electric alternator/motor of claim 3, wherein the magnetically saturable portion is disposed between said distinct but adjacent second slots.

5. The electric alternator/motor of claim 1, wherein the second winding is disposed in the second slots in an alternatingly reverse winding pattern relative to the first winding.

6. The electric alternator/motor of claim 1, wherein the rotor is a permanent magnet rotor.

7. An alternator/motor comprising a rotor and a stator, the stator having a plurality of rotor magnetic circuits and a plurality of secondary magnetic circuits, each rotor magnetic circuit cooperatively defined between the stator and rotor and encircling a first portion of at least one power winding of the stator, each secondary magnetic circuit encircling a second portion of the power winding disposed outside the rotor magnetic circuits, at least one control winding associated with secondary magnetic circuits such that a saturating control current through the control winding magnetically saturates a portion of the stator carrying said secondary magnetic circuits which is distinct from a stator portion carrying the rotor magnetic circuits, the secondary magnetic circuits being paired such that in one secondary magnetic circuit the associated control winding and stator winding second portion are wound around the stator in a same direction while in the other secondary magnetic circuit the associated control winding and stator winding second portion are wound around the stator in opposite directions.

8. The alternator/motor as defined in claim 7, wherein the stator has a plurality of second slots in which said second portions of the power winding and a portion of the control winding are disposed, and wherein each said secondary magnetic circuits encircles one of said second slots.

9. The alternator/motor as defined in claim 7, wherein the stator has a plurality of radial first slots in which said first portions for the power winding are disposed, and wherein each said first magnetic circuits encircle at least one of said first slots.

10. The alternator/motor as defined in claim 7, wherein the rotor is a permanent magnet rotor.

11. An alternator for producing an alternator alternating current, the alternator comprising a rotor, a stator assembly and a saturation apparatus, the stator assembly having at least one stator winding for providing said alternator alternating current, the stator winding having at least a pair of legs serially connected with one another, the legs spaced apart circumferentially from one another relative to the stator assembly, the rotor and stator assembly co-operating to define at least two rotor magnetic circuits for conducting rotor magnetic circuits encircling a first portion of one of said legs of the stator winding and another one of the rotor magnetic circuits encircling a first portion of the other of said legs of the stator winding, the stator assembly defining at least a pair of secondary magnetic circuits for conducting magnetic flux, one of the secondary magnetic circuits encircling a second portion of one of said legs of the stator winding and another one of the secondary magnetic circuits encircling a second portion of the other of said legs of the stator winding, the secondary magnetic circuits being remote from the rotor magnetic circuits, the saturation apparatus associated with at least a portion of each secondary magnetic circuit, said at least a portion of each secondary magnetic circuit being remote from the rotor magnetic circuits, the saturation apparatus adapted to selectively magnetically saturate said portion of each secondary magnetic circuit at a selected frequency, the saturation apparatus adapted to magnetically saturate one of the secondary magnetic circuits in the same direction as magnetic flux circulating that secondary magnetic circuit while magnetically saturating another one of secondary magnetic circuits in the direction opposite to magnetic flux circulating that secondary magnetic circuit.

12. The alternator as claimed if claim 11, wherein each secondary magnetic circuit circulates only one leg of the stator winding.

13. The alternator as defined in claim 11, wherein the stator has a plurality of radial first slots in which said portions of the power winding are disposed, and wherein each said first magnetic circuits encircle at least one of said first slots.

14. The alternator as defined in claim 11, wherein the saturation apparatus comprises at least one control winding associated with said secondary magnetic circuits such that a saturating control current through the control winding magnetically saturates said at least a portion of said secondary magnetic circuits.

15. The alternator as defined in claim 11, wherein the rotor is a permanent magnet rotor.

16. An alternator for producing an alternator alternating current, the alternator comprising a rotor and a stator assembly having at least one stator winding for providing said alternator alternating current, the stator winding having at least a pair of legs serially connected with one another, the legs spaced apart circumferentially from one another relative to the stator assembly, the rotor and stator assembly co-operating to define at least two rotor magnetic circuits for conducting rotor magnetic flux, one of the rotor magnetic circuits encircling a first portion of one of said legs of the stator winding and another one of the rotor magnetic circuits encircling a first portion of the other of said legs of the stator winding, the stator assembly defining at least a pair secondary magnetic circuits for conducting magnetic flux, one of said secondary magnetic circuits encircling a second portion of one of said legs of the stator winding and the other one of said secondary magnetic circuits encircling a second portion of the other of said legs of the stator winding, the secondary magnetic circuits being outside the rotor magnetic circuits, the secondary magnetic circuits having a saturation apparatus including at least one control winding wound around at least a portion of the stator carrying the secondary magnetic circuits, said at least a portion of the secondary magnetic circuits being distinct from a stator portion carrying the rotor magnetic circuits, the control winding adapted to magnetically saturate said portion of the stator carrying the secondary magnetic circuits when a saturation threshold current passes through the control winding, wherein one of the secondary magnetic circuits has its control winding wound in a same direction as the second portion of the stator winding leg associated therewith, and wherein the other one of the secondary magnetic circuits has its control winding wound in an opposite direction relative to the second portion of the stator winding leg associated therewith.

17. The alternator is claimed in claim 16, wherein the control winding has a multiple turns ratio relative to said second portion of the respective legs of the stator winding.

18. The alternator as claimed in claim 16, wherein each secondary magnetic circuit circulates only one leg of the stator winding.

19. The alternator as defined in claim 16, wherein the stator has a plurality of radial first slots in which said first portions of the power winding are disposed, and wherein each said first magnetic circuits encircle at least one of said first slots.

20. The alternator as defined in claim 16, wherein the rotor is a permanent magnet rotor.

21. An alternator comprising a rotor and a stator, the stator having at least one stator winding, the stator defining at least two rotor magnetic circuits and at least two secondary magnetic circuits separate from the rotor and the rotor magnetic circuits, the stator winding having first portions thereof encircled only by the rotor magnetic circuits and second portions thereof encircled only by the secondary magnetic circuits, the alternator further comprising means for magnetically saturating at least a portion of respective pairs of secondary magnetic circuits in opposite relative directions to thereby regulate alternator output while leaving the rotor magnetic circuits un-saturated, and a control apparatus adapted to control said means to selectively control a saturation level of said at least a portion of said respective pairs of secondary magnetic circuits.

22. The alternator as defined in claim 21, wherein the stator has a plurality of radial slots in which said stator winding first portions are disposed, and said rotor magnetic circuits encircle a selection of said plurality of radial slots.

23. The alternator as defined in claim 22, wherein the plurality of radial slots are located on a periphery of the stator opposing the rotor.

24. The alternator as defined in claim 23, further comprising a plurality of second slots located radially further away from the rotor than said plurality of radial slots, the second portions of the stator winding being disposed in respective said second slots, the second disposed in the stator outside the rotor magnetic circuits.

25. The alternator as defined in claim 21, wherein said means for magnetically saturating comprises at least one control winding in the stator, the at least one control winding associated with said secondary magnetic circuits such that a saturating control current through the control winding magnetically saturates said at least a portion of said secondary magnetic circuits.

26. The alternator as defined in claim 25, wherein the at least one control winding has a multiple turns ratio relative to said second portions of the at least one stator winding.

27. The alternator as defined in claim 21, wherein the rotor is a permanent magnet rotor.

* * * * *